US 6,427,353 B1

(12) United States Patent
Nelson et al.

(10) Patent No.: US 6,427,353 B1
(45) Date of Patent: *Aug. 6, 2002

(54) HIGH SPEED ACQUISITION AND CALCULATION OF DIMENSIONAL VARIABLES WITH VIBRATION AND SKEW ERROR REDUCTION

(75) Inventors: Cecil H. Nelson, Chanhassen; Rodney R. Hintz, Delano; Thomas P. Bartsch, Maple Grove, all of MN (US)

(73) Assignee: Rockwell Automation Technologies, Inc., Mayfield Heights, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,102

(22) Filed: May 28, 1998

(51) Int. Cl.[7] .............................. G01B 3/00; G01B 5/00
(52) U.S. Cl. .......................... 33/552; 33/542; 33/544.5; 33/545; 33/549
(58) Field of Search ...................... 33/545, 551, 543, 33/542, 544.5, 546, 548, 549, 550, 552, 553, 554, 555, 555.1

(56) References Cited

U.S. PATENT DOCUMENTS

| 3,101,552 | A | * | 8/1963 | Tandler et al. ................. 33/555 |
| 3,805,036 | A | * | 4/1974 | Michaud et al. ............. 33/555.1 |
| 3,869,800 | A | * | 3/1975 | Bartlett ......................... 33/545 |
| 4,181,958 | A | * | 1/1980 | Juengel et al. ................. 33/505 |
| 4,447,959 | A | * | 5/1984 | Watanabe et al. ........... 33/544.5 |
| 4,574,494 | A | * | 3/1986 | Mailliet et al. ................ 33/552 |
| 4,711,037 | A | * | 12/1987 | Saadat .......................... 33/543 |
| 4,986,004 | A | * | 1/1991 | Hartmann et al. ......... 33/555.1 |
| 4,991,304 | A | * | 2/1991 | McMurtry .................... 33/545 |
| 5,095,634 | A | * | 3/1992 | Overlach et al. ............. 33/548 |
| 5,259,121 | A | * | 11/1993 | Possati et al. ................ 33/542 |
| 5,465,496 | A | * | 11/1995 | Axon ........................... 33/543 |
| 5,485,678 | A | * | 1/1996 | Wagg et al. .................. 33/543 |
| 6,154,713 | A | * | 11/2000 | Peter et al. ................... 33/504 |
| 6,158,136 | A | * | 12/2000 | Gotz et al. ................... 33/503 |

FOREIGN PATENT DOCUMENTS

DE              3123944       *  2/1982

* cited by examiner

Primary Examiner—Christopher W. Fulton
Assistant Examiner—Yaritza Guadalupe
(74) Attorney, Agent, or Firm—Patrick S. Yoder; Alexander M. Gerasimow; William R. Walbrun (57) ABSTRACT

A method and apparatus for high speed acquisition of the dimensional parameters of a work piece are effected by simultaneously acquiring probe positional information, converting the probe positional information to standard characteristic data, and calculating multiple dimensional geometries using the converted probe position information. Selected characteristic data may be stored for use with multiple dimensional geometry calculations, reducing the calculation time. A computer and associated software are used to convert the positional information to dimensional geometry information.

24 Claims, 5 Drawing Sheets

FIG. 6
PRIOR ART ured. Skew error cannot be eliminated, only reduced, by reducing the rotation rate of the workpiece. In addition, rotational rate reduction reduces throughput of the system
HIGH SPEED ACQUISITION AND CALCULATION OF DIMENSIONAL VARIABLES WITH VIBRATION AND SKEW ERROR REDUCTION

BACKGROUND OF THE INVENTION

The present invention relates generally to acquisition and calculation of dimensional variables of a workpiece, and specifically to high speed acquisition thereof with vibration and skew error reduction.

In industry vast numbers of parts must be manufactured to within certain tolerance levels, not only commonly referred to tolerances such as diameter and thickness, but also geometric dimensioning and tolerancing. Such geometric dimensioning and tolerancing is used when part features are critical to function or interchangeability, when functional gaging techniques are desirable, when checking to see that the design of a part and a manufactured part are consistent, and the like. Certain characteristics of geometric dimensioning and tolerancing are used to control the features of the part. These characteristics include flatness, straightness, concentricity, circularity, cylindricity, perpendicularity, angularity, parallelism, and the like. These characteristics define various tolerance zones within which the specific conditions of the object being dimensioned must fall. Each characteristic requires specific measurements to be performed on the object in order to determine whether the specific characteristic is met.

Geometric dimensioning and tolerancing standards have been set forth by the American National Standards Institute (ANSI) in ANSI Y14.5M-1994 and the like, which detail how to measure a wide variety of geometric dimensions of an object.

Geometric dimensioning and tolerancing allows for the provision of reliable parts in quantity and with maximum production tolerances. It further confirms whether designed parts are capable of manufacture to exacting standards. It further assists in the use of computerization design techniques. Given the increasing sophistication of products in today's market place, the tolerances for parts have become increasingly more strict. Geometric dimensioning and tolerancing allows for more accurate and exacting standards of tolerances in the manufacturing process.

Geometric dimensioning also finds use in examination of an existing part where the blueprints or plans for the part may have been lost or are otherwise unavailable. Exacting standards for geometric dimensioning allow for reproducability of a part on the basis of the part itself, as opposed to the plans.

In order to effectively use geometric dimensioning and tolerancing, apparatus and a process to obtain physical parameter data from an object are required. Because of the potentially large quantity of information required in performing geometric dimensioning and tolerancing, speed in measurement techniques, as well as accuracy, is required. Common dimensional measuring techniques include sequential acquisition and reading of dimensional variables of an object, and multiplexing the sequential readings together. However, even in a static environment in which the object is not moving rotationally or otherwise, vibration due to movement of the object, the platform in which the object is resting, and the like may introduce errors into measurements and propagate errors through measurements. In a sequential reading of dimensional variables of an object, when separate sensor readings are taken, a vibrational error may be introduced into the measurements. The result is an unclear representation of the geometry of the piece. This unclear or fuzzy picture will vary depending upon the extent of the ambient vibration. It is nearly impossible to fully attenuate ambient vibrations. Accordingly, even the most exacting of static environment measuring techniques using sequential reading of dimensional variables create imprecise results.

The problems with using sequential reading for measuring dimensional variables are increased even further when the object to be measured is undergoing rotational or translational motion, or the like. Rotation during measurement introduces a skew error no matter how fast the sequential reading is done. This skew error is introduced through time delay. Even if the sampling rate is very fast, measurement of imperfect shapes experiencing rotational motion will have an error component introduced. This skew error is further complicated by ambient vibration which may be by movement of the part or the platform on which the part is resting. Rotational translational and vibrational errors each cause problems, separately, and in combination.

Sequential sampling instrumentation is inherently incapable of taking measurements at two diametrically opposed points on a workpiece in rotational motion. The introduced error will be proportional to the rotation rate of the workpiece. Even when the rotation rate is known, the sampling error cannot be eliminated, only reduced, by reducing the rotation rate of the workpiece. In addition, rotational rate reduction reduces throughput of the system In performing measurements of a dimensional nature on a workpiece, extremely important factors are repeatability and reproductability. These factors depend on a variety of other factors, including operator variability, skew error, vibrational error, and translational error. Vibrational and translational errors may change each time an object is to be measured. The ambient conditions of vibration will never be identical between any two measuring sequences. Skew error may be affected by dirt on the mounting platform for the object, as well as wear on the object. Operator variability takes into account differences between the way an object is placed for measurement, and operator error.

The measurement of static dimensional variable accuracy is limited by time dependent motions such as vibration that is present in all environments. When measuring dynamic dimensional variable accuracy, it is also limited by intentional and non-intentional time dependent motion. This motion includes rotational, translational, and vibrational motion. Traditional measurement systems minimize the intentional time dependent motion errors by constraining acceleration and velocity of the object to low values. While this solution is partially effective in minimizing intentional time dependent motion errors, it does not address vibrational error. Further, this solution greatly increases the time required to measure the dimensional variable of an object.

It would be desirable to provide method and apparatus for geometric dimensioning and tolerancing which serves to reduce operator variability, while largely eliminating vibrational, translational, and skew errors.

BRIEF SUMMARY OF THE INVENTION

The present invention overcomes the problems of the prior art by providing a high speed acquisition and calculation method and apparatus which reduces vibrational, translational, and skew errors by measuring all inputs necessary to define the variable in the same relative time frame of reference.

With the method and apparatus of the present invention, multiple probes are attached to a fixture, and physically acquire positional information readings on the workpiece simultaneously, in effect creating a snap-shot image of the workpiece at a certain instant. The probes define a surface location on the workpiece by converting the physical location to a signal that can be processed by associated instrumentation operatively connected to the probes. Because all of the probes simultaneously contact and measure the workpiece, rotational skew error and ambient vibrational and translational errors are greatly reduced. The rotational, translational, and vibrational error elements of the measurement are reduced by the simultaneous measurement of the workpiece. When the multiple probes measure the workpiece simultaneously, any ambient vibration will be affecting all of the part equally, so if the part is displaced from a set position, the probes will nevertheless detect only the physical characteristic dimensional data of the workpiece since the probes measure all information simultaneously. Similarly, when the method and apparatus of the present invention obtain dimensional variable information through the simultaneous use of multiple probes, skew error due to rotation of the workpiece at different measurement times and translational error are greatly reduced.

Multiple support structures are used to hold parts being measured. In a constrained support, the part being measured is restrained mechanically. This type of support allows for easy rotational movement of the workpiece. In a freely moving support, the part is placed in a fixture with a certain degree of extra room. In this situation, the part may be movable side to side within the fixture. This motion is translational. If a sequential probe measurement is used, the probe itself may cause the part to move, affecting the accuracy of the measurement. Further, if the part is subjected to vibrational or other forces, it may shift within the fixture between probe contacts, further increasing the measurement error potential. Examples of support types include v-supports, centers, and surface plates which are also referred to as granite plates.

The method of the present invention, as has been mentioned, involves the simultaneous probing of the workpiece by multiple probes in order to determine all relevant dimensional variables associated with the workpiece at the same time. The probes are arranged so that they contact the workpiece in the appropriate positions to measure the dimensional variables required to be measured. For example, in the case of diameter measurements, two probes are used. They may be separated by 180 degrees, but may also be placed in other configurations allowing proper measurement. The diameter of the workpiece is a function of the position of the two probes. If the first probe determines position P1 and the second probe determines position P2, the workpiece diameter is P1+P2. The center point between the two probe positions is (P1−P2)/2.

The multiple probes are used to get raw data readings from the workpiece simultaneously. Each discrete measurement is a snap-shot of the workpiece at the particular time the probes contact the workpiece. With the raw data gathered from the probe readings of the workpiece, multiple form calculations may be made. The raw data may be used to calculate multiple characteristics of the workpiece. This reuse of points allows the method of the present invention to eliminate to a degree unnecessary and time-consuming the repetition of calculations. The effect of this is that calculations may be done much more closely to real time. For example, the method of the present invention can define a line or plane at a particular instant of time. Several levels of calculations may be made in which calculations made previously in the sequence of events may be used to generate further geometric dimensioning information.

These multiple levels of calculations allow for the method of the present invention to provide more complete data in a faster fashion. Virtual gages may be defined from the raw probe position data generated by each discreet measurement. These virtual gages may be used to further calculate different dimensioning characteristics without the need for recalculating from the raw data. In this way, the present invention uses the raw data to increase the calculation speed for determining dimensional characteristics of the workpiece.

Many forms of apparatus exist which will allow the method of the present invention to be embodied. The various probe positions and locations will be determined by the characteristics which are to be measured. Different characteristics require different probe positioning. The discreet nature of the method of the present invention, namely the simultaneous acquisition of dimensional variables, allows certain portions of the probe position information to be used to determine multiple characteristics of the workpiece. The probes are touched to the workpiece to define the surface location by converting the physical location to a signal that can be processed by instrumentation attached to and communicating with the probes. The number of probes used will vary depending upon the specifics of the measurement and the precision required. Probe types may also be varied depending on variables such as physical space available, required stroke length, contact pressure, contact geometry, environmental conditions, the need for pneumatic advance or retract, and the like. The probes relay physical location data to the instrumentation, which in turn performs gaging equations, calibrates and balances the probes, displays the results, and performs further processing as required. The instrumentation may include such electronic components as filters, demodulators, analog to digital (A/D) and digital to analog (D/A) converters, liners, power supplies and the like.

BRIEF DESCRIPTION OF THE DRAWINGS

FIGS. 2 and 2B are block diagram of the control system of an embodiment of the invention;

DESCRIPTION OF THE PREFERRED EMBODIMENT

Figure 1:
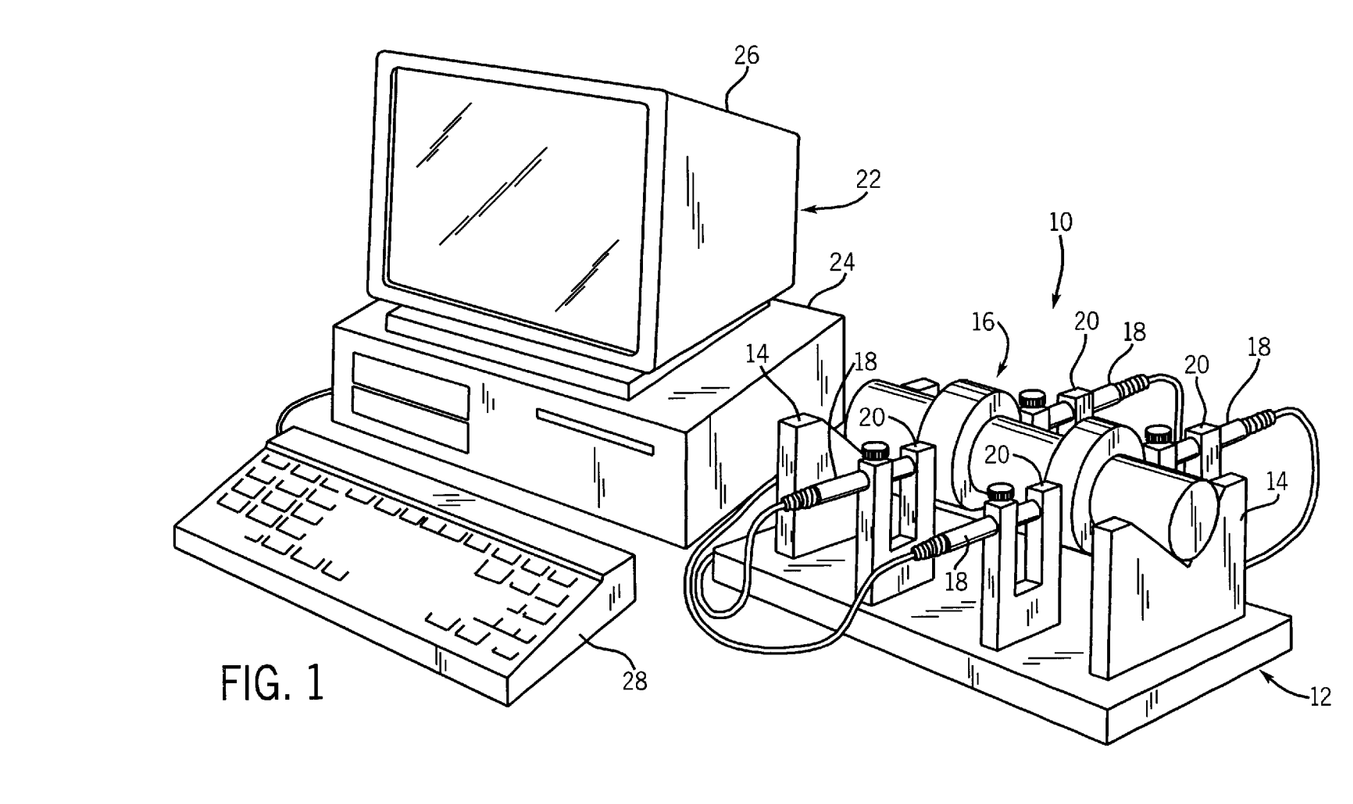
FIG. 1 is a perspective view of an embodiment of the invention, and a V-support.

Referring now to the drawings, and especially to FIG. 1, an embodiment of the dimensional measuring apparatus 10 may be seen. Dimensional modeling apparatus 10 comprises a part fixture 12, which may take a variety of configurations. As shown in FIG. 1, fixture 12 has two V-supports 14 which serve to support work piece 16. A plurality of probes 18 are positioned so as to be able to contact work piece 16 at appropriate locations for simultaneously measuring the parameters of work piece 16. Probes 18 may be supported by supports 20, as well as by other structures not shown. The probes 18 are positioned to effectively perform the desired calculations and measurements to be made on work piece 16. The configuration of probes 18 may be work piece specific. Each of the probes 18 is controllably connected to control unit 22. Control unit 22 comprises a processor 24, an optional display device 26, such as a monitor, and an optional input/output device 28, such as a keyboard, or relay.

The control unit 22 serves to control operation of the probes 18 with respect to the coordinated simultaneous measurement of physical parameter characteristics of a work piece 16. The control unit 22, through processor 24 and associated software, allows operation of the probes 18 to allow for simultaneous measurement of all pertinent or desired physical characteristics of the work piece 16. The simultaneous measurement by probes 18 of physical characteristic data of the work piece 16 greatly reduces vibrational, rotational, and translational errors which may be associated with various ambient and manmade conditions.

Figure 2:
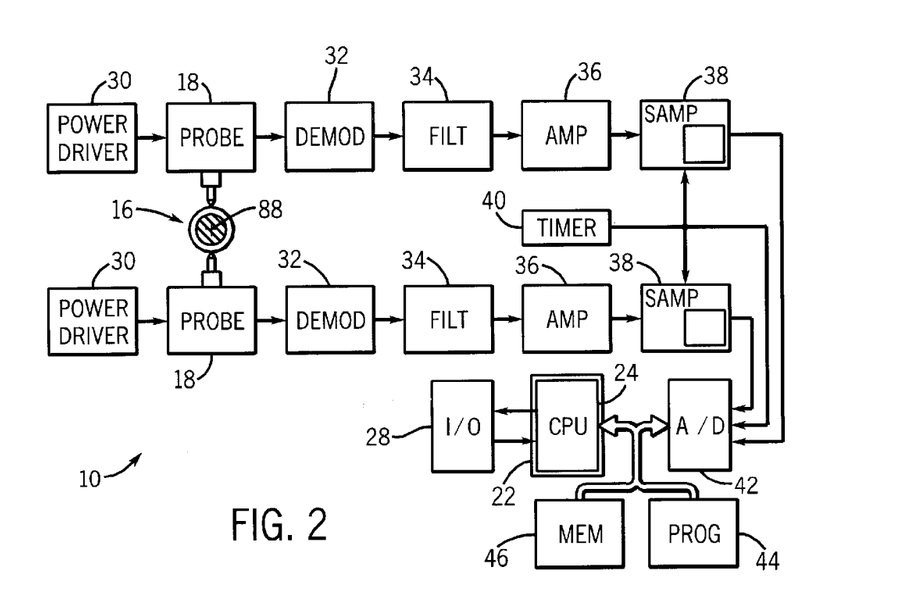

The software associated with control unit 22 captures a voltage signal which is proportional to the physical position of the probes 18. Referring now also to FIG. 2, the interaction between the probes 18 and the control unit 22, and the associated structure, is shown in block diagram. Each probe 18 is excited by an oscillator and power driver 30. Each probe 18 is simultaneously monitored. Each probe 18 functions the same, so only one probe 18 will be described. Each probe 18 is maintained in continuous contact with the work piece 16. The probes 18 are pneumatically or spring biased to maintain continuous contact with the workpiece 16. In the probe movement, a specific measurable displacement of the probe position is effected.

Synchronous demodulator 32 uses the measurement of the amount of displacement of probe 18 to generate a voltage signal proportional to the displacement of probe 18. This voltage signal is filtered by filter 34 to isolate the fundamental or DC component of the voltage. Amplifier 36 is used to provide amplification and offset of the signal in order to provide sensitivity control over the probe measurement. The sensitivity and offset are tailored to optimize the performance of probes 18. The signal generated by amplifier 36 is sampled and held or tracked and held by sampler 38. Each probe 18 has the same associated structure. A timer 40 to control the simultaneous acquisition of data is connected in parallel with the probe circuits. Each sampled or tracked signal is sent to analog to digital converter 42, which converts the analog voltage signal to a digital signal capable of being manipulated by control unit 22. The CPU 24, using stored program software 44 and computer memory 46, analyzes and converts the digital signals provided from analog to digital converter 42. The signals are representative of physical characteristics and measurements of work piece 16 obtained by probes 18.

Figure 2A:
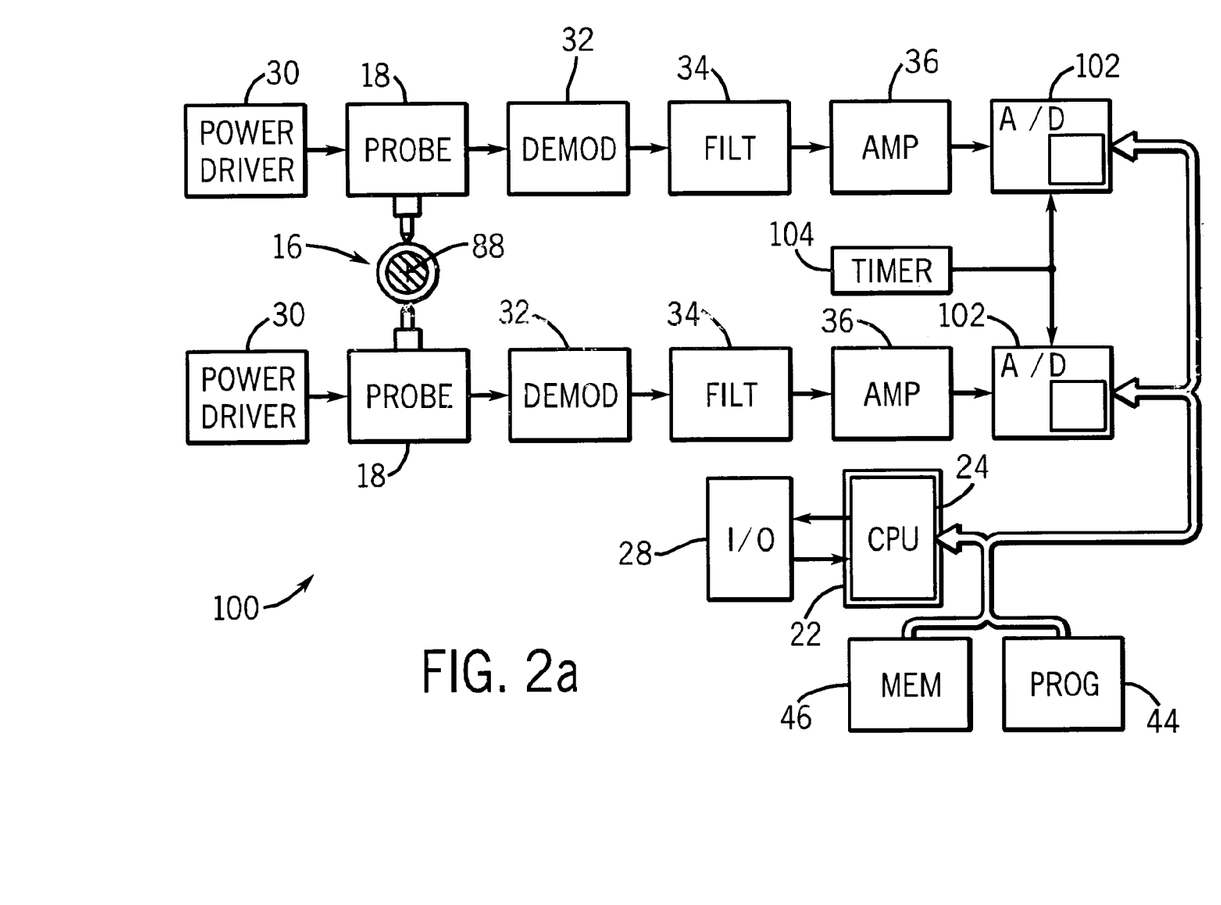

An alternative embodiment 100 of the simultaneously acquired probe position information may be seen in FIG. 2*a*. In this embodiment, the sample and hold or track and hold sampler of the previously disclosed embodiment is replaced by a plurality of analog to digital converters 102, one per probe channel. The analog to digital converters 102 are instructed to simultaneously acquire the analog signal generated by the associated probe by a common timer control 104. The remainder of the alternative embodiment 100 is identical to embodiment 10 as shown in FIG. 2, and will not be described again herein. The use of multiple A/D converters, while increasing the cost of circuitry, will allow also for increased performance, allowing higher speed of readings as well as flash converters.

Figure 3:
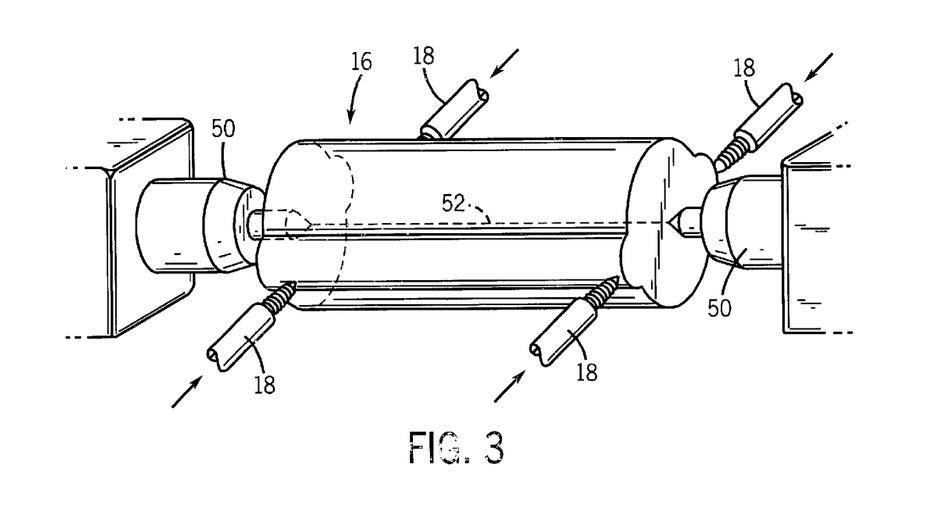
FIG. 3 shows an alternative embodiment of the invention.

Referring now to FIG. 3, an alternative embodiment of the support structure or fixture may be seen. The alternative support structure includes end supports 50 known as centers, which are positionable to hold the work piece 16 in position to be dimensionally measured by probes 18. The center configuration shown in FIG. 3 allows for ease in rotation of the work piece 16 about its longitudinal axis 52. The probes 18 are again mounted to a suitable structure such as that shown in FIG. 1.

Figure 4:
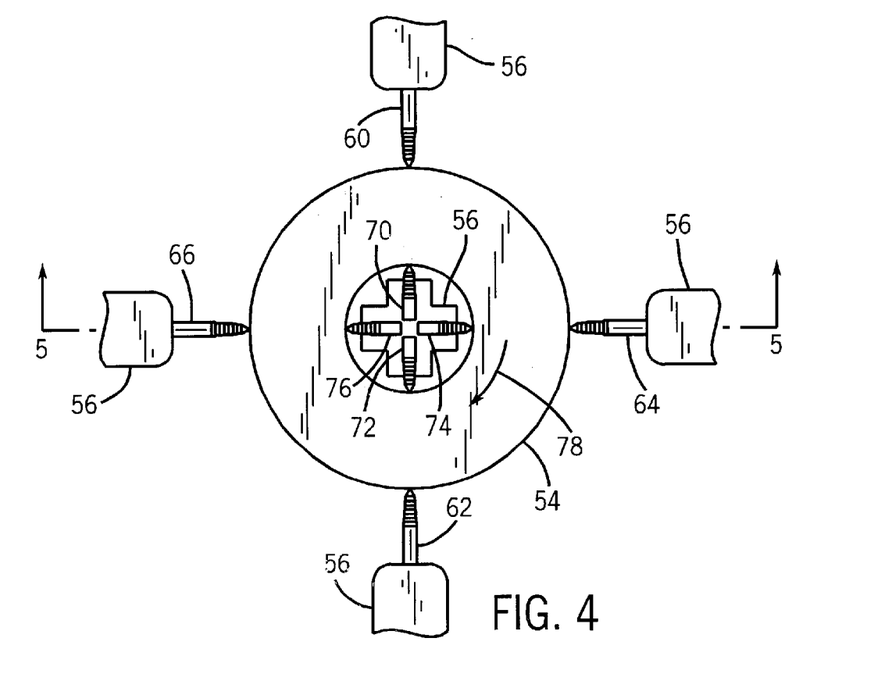
FIG. 4 is a top view of another alternative embodiment of the invention using centers.
Figure 5:
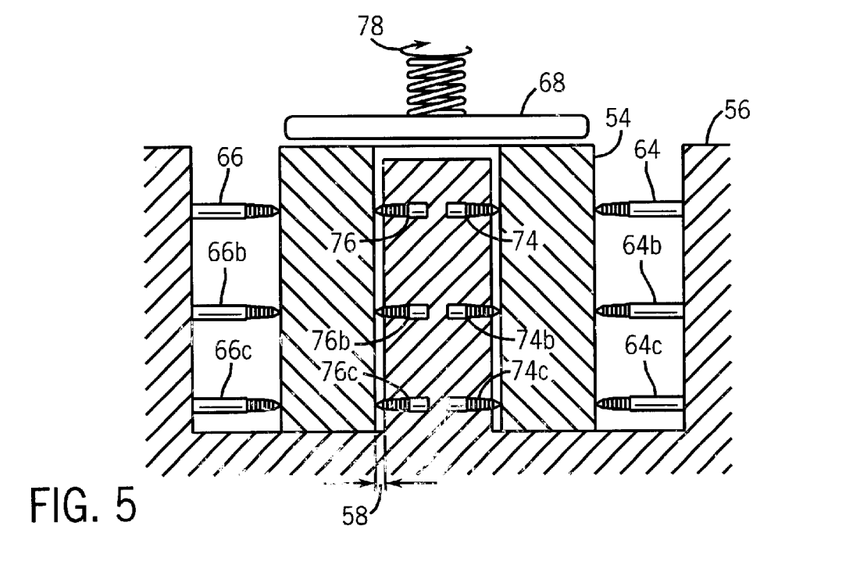
FIG. 5 is a section view of the embodiment of FIG. 4 taken along lines 5—5 thereof.

FIGS. 4 and 5 show another alternative fixture for dimensional tolerancing of another work piece 54. The fixture 56 shown in FIGS. 4–5 may be specifically designed to the specific work piece 54. Fixtures such as fixture 56 are designed so that a work piece 54 may be placed within the fixture 56 and be allowed a small translational movement, while still having constrained limits of motion. The translational motion, also referred to as floating, is a necessary function of the fixture 56. In order to effectively position the work piece 54 within fixture 56, there must necessarily be some clearance 58, as shown in FIG. 5. This clearance 58 allows for the work piece 54 to move translationally within the fixture 56. With conventional sequential measurement techniques, the probes could move the work piece 54 translationally, creating a translational error in measurement. With the apparatus and method of the present invention, all of the probes of the fixture 56 contact and measure the work piece 54 simultaneously. Since the parameter measurement is simultaneous, the translational movement and/or position of work piece 54 is made irrelevant. The relative position of the work piece 54 does not matter, since the probes simultaneously acquire readings on the work piece 54.

Referring now specifically to FIG. 4, probes 60, 62, 64, and 66 may be seen to contact the outer surfaces of work piece 54, and probes 70, 72, 74, and 76 contact the inner portion of work piece 54. All of the probes contact work piece 54 simultaneously. From the measurements and positional information acquired from the probes, a large variety of dimensional characteristics and physical parameter data of the work piece 54 may be obtained. For example, probes 64 and 66 define the outer diameter of work piece 54. Probes 64 and 66 also define the center of work piece 54. Probes 66 and 76 may be combined to provide thickness of work piece 54. Probes 74 and 76 are used to define the inner diameter of work piece 54. Probes 74 and 76 may also be used to define the center point of work piece 54. Concentricity of the inner and outer surface circles of work piece 54 may be compared by using a comparison of the center point information obtained from probes 64 and 66, combined with the center point information obtained from probes 74 and 76. Similarly, probes 60 and 62, and 70 and 72, can be used to define the center point of the work piece 54. In FIG. 5, probes positioned in similar locations with respect to the top view have identical numbers, with modifying letters. Accordingly, probes 66*b* and 66*c* are positioned similarly to probe 66, but at different vertical positions along the work piece 54.

Since all probe measurements are taken simultaneously, translational, vibrational, and rotational measurement errors are greatly reduced. The probe measurements allow the computer 24 to essentially generate a snapshot of the work piece 54 with respect to its dimensions and tolerances computed from probe data. Fixture 56 may further include a member 68, which may be positioned so as to contact work piece 54 as shown in FIG. 5. When member 68 contacts work piece 54, it may be used to rotate work piece 54, as is shown in rotational arrow 78. When work piece 54 has been rotated a predetermined amount, the probes may once again perform measurements on the work piece 54. In combination with the measurements obtained, and the known rotational movement of the work piece 54, generation may be made of the characteristics of the surfaces of work piece 54. For example, using the rotational or angular position simultaneously with the measured probe data will allow the computer 24 to reconstruct the features of the work piece 54. This reconstructed feature may be used to indicate to the operator where desirable or undesirable sections of the work piece 54 are located.

Figure 6:
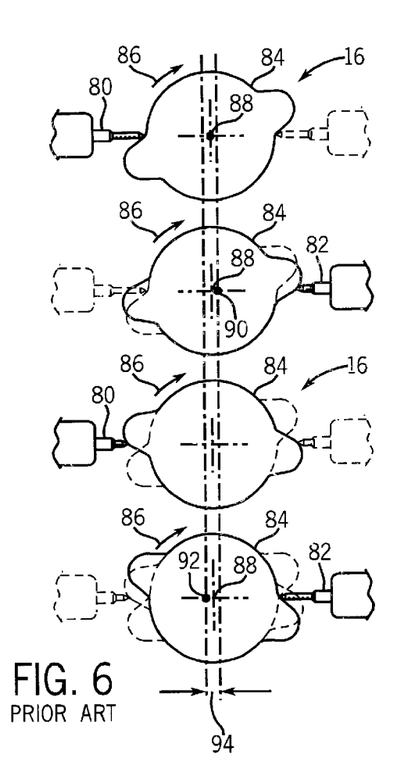
FIG. 6 shows a sequence of prior art probe measurement configurations.

As has been mentioned, the apparatus and method of the present invention accomplishes simultaneous acquisition of the physical parameters of the workpiece, so as to largely reduce translational, vibrational, and rotational errors in measurement. A sequential measurement scheme is representatively shown in FIG. 6. In FIG. 6, probes 80 and 82 are shown to contact work piece 84 as it rotates in the direction shown by rotational arrow 86. FIG. 6 illustrates skew or rotational errors in measurement by probes 80 and 82 of work piece 84. The center point of work piece 84 is shown at point 88. During a sequential use of probes 80 and 82, at time T1, probe 80 will measure work piece 84. Before probe 82 measures work piece 84 at time T2, work piece 84 has rotated. When data from probe 80 at time T1 and probe 82 at time T2 are combined to yield a calculation of the center point of work piece 84, the center point is calculated to be at point 90 as shown. This is displaced from the actual center point 80 due to the skew error caused by the rotation of work piece 84. At time T3, probe 80 measures work piece 84 again. At time T3, information from probe 82 taken at time T2 and probe 80 taken at time T3 may be combined to yield a calculation of the center point 88 of work piece 84. At time T3, the center point calculated will be at point 88, as it should be. At time T4, probe 82 once again measures work piece 84. However, as may be seen from the figure, work piece 84 has again rotated from its position when it was contacted by probe 80 at time T3. A calculation of the center point of work piece 84 from the position data obtained by probe 80 at time T3 and probe 82 at time T4 yields a calculated center point at point 92, displaced once again from true center point 88. The extreme calculated center points vary over a gap 94. Given the apparatus and method of measurement of physical characteristics of work piece 84 shown in FIG. 6, rotational error is nearly unavoidable.

Figure 7:
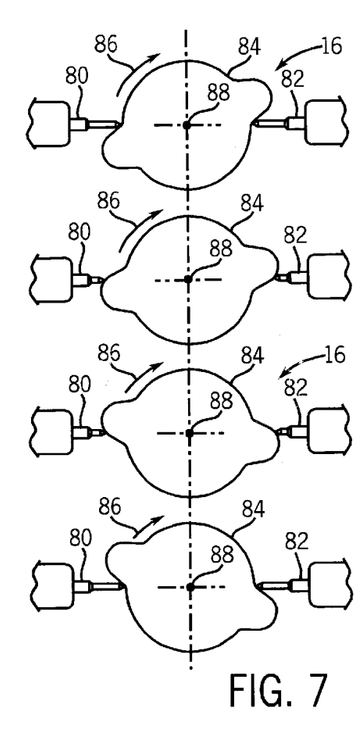
FIG. 7 shows a series of probe measuring configurations embodying the present invention.

The method and apparatus of the present invention with respect to the calculation of center point data of work piece 84 as it rotates according to rotational arrow 86 is shown in FIG. 7. At each time, T1, T2, T3, and T4, both probes 80 and 82 measure work piece 84 simultaneously. At each time, the calculated center point 88 of work piece 84 is the true center point 88 of work piece 84. This accurate measurement of center point 88 occurs no matter where along the rotational arc work piece 84 is positioned. Since the probes 80 and 82 simultaneously acquire measurement of the work piece 84 to obtain physical parameter characteristic information of work piece 84, skew or rotational error is largely reduced.

The method of the present invention involves the simultaneous probing of various locations on a work piece by a plurality of probes. The probes are used to measure specific parameters and data position information of the work piece. The information obtained may be used in several ways, and to compute a variety of tolerance measurements and calculations. The positional information data gathered from the probes may have application to multiple calculations. For example, referring to FIG. 4, the probe data information obtained from probes 64 and 66 can be used to find both the outer diameter and the center point of work piece 54. To determine the outer diameter of work piece 54, the position data from probes 64 and 66 is added together. To determine the center point of work piece 54 along the axis between probes 64 and 66, the probe position 64 information is subtracted from the probe position 66 information, with the result divided by two.

The information data from probe 66 may also be used in conjunction with the information data from probe 76 to determine the thickness of the work piece 54 between probes 66 and 76. To determine this thickness, the position data from probes 66 and 76 is added together. There are numerous geometric dimensioning and tolerancing calculations which may be made based on probe data information. The method of the present invention simultaneously acquires all positional and physical characteristic data of a work piece, allowing calculation of all desired dimensions and tolerances without the need for making a further, repetitive measurement. Simultaneous measurement of all relevant information largely reduces translational, vibrational, and rotational errors in dimensional measuring. Further, the information obtained may be used to calculate secondary information which may then be used to calculate tertiary information and beyond.

The position data information gathered from the probes may be used to define common gages which are used in multiple tolerancing equations. The use of such virtual gages which can define a line or plane at one particular instant in time eliminates the necessity of repetitive calculation of common geometric and dimensional characteristics of the particular work piece.

The calculations and work piece position and physical characteristic data which are required to perform the various tolerancing calculations are discussed and disclosed in ANSI/ASME Y14.5M-1994 Standards, which are hereby incorporated by reference. Further, a number of publications discuss in detail the tolerancing and geometric dimensioning process with respect to manipulation of specific information. Such a reference is Geo-Metrics III by Lowell W. Foster. As the calculations which are required to translate specific dimensional and physical characteristic data to geometric dimensioning and tolerancing are known, they will not be discussed further herein.

The method of the present invention provides a method by which all relevant physical characteristic data of a work piece are acquired simultaneously to largely reduce errors based on vibration, translation, and rotation of the work piece being dimensioned. Following the acquisition of physical characteristic and parameter data of the work piece, the position and physical information gathered is converted to standard characteristic data with characteristic equations. The characteristic data is then used to calculate the desired dimensional geometries of the work piece. The method of the present invention allows operation of so-called virtual gages which eliminate the need for redundant and time-consuming recalculations. Since all desired information is gathered at the same time, virtual gages can be defined and reused, eliminating some redundant calculations.

The detailed description outlined above is considered to be illustrative only of the principles of the invention. Numerous changes and modifications will occur to those skilled in the art, and there is no intention to restrict the scope of the invention to the detailed description. The preferred embodiment of the invention having been described in detail the scope of the invention should be defined by the following claims.

What is claimed is:

1. A method of contact measurement of multiple input parameters of a workpiece using a plurality of spaced apart probes capable of contacting the workpiece, comprising the steps of:

probing workpiece via the probes, the probes being fixedly supported at desired locations and the workpiece being movable;

simultaneously acquiring a first set of discrete probe position information including simultaneously acquired information from each of the probes;

converting the first set of acquired probe position information to standard characteristic data; and calculating multiple dimensional geometries using the converted probe position information.

2. A method of contact measurement of multiple input parameters of a workpiece as in claim 1, wherein the converting step further comprises storing selected characteristic data for use with multiple dimensional geometry calculations, whereby the calculation time is reduced.

3. The method of claim 1, further comprising the step of rotating the workpiece relative to the probes and simultaneously acquiring a second set of discrete probe position information.

4. The method of claim 1, further comprising the step of displaying the characteristic data.

5. The method of claim 1, further comprising the step of displaying the calculated geometries.

6. Apparatus for high speed acquisition of dimensional parameters of a workpiece, comprising:

a plurality of spaced apart probes positionable to simultaneously acquire dimensional parameters of the workpiece, said probes generating position information signals corresponding to the contact points with the workpiece;

sampling circuitry coupled to the probes and adapted to sample the position information signals simultaneously from the probes, the sampling circuitry for each probe comprising an independent probe circuit, each probe circuit comprising an oscillator, a filter, an amplifier, and a sampler operatively connected in series, and wherein the sampling circuitry further comprises an analog to digital converter operatively connected to the probe circuits, said analog to digital converter converting said analog position information signals from each probe to a digital position information signal which is sent to said processor, and a timer operatively connected to said analog to digital converter to control simultaneous conversion of analog probe information signals to digital probe information signals; and a computer having a processor, display means, and input means, said computer operatively connected to receive the position information signals from said sampling circuitry and capable of converting the position information to dimensional geometry information.

7. Apparatus for high speed acquisition of dimensional parameters of a workpiece as in claim 6, and further comprising:

a plurality of workpiece supports.

8. Apparatus for high speed acquisition of dimensional parameters of a workpiece as in claim 7, wherein said workpiece supports are v-supports.

9. Apparatus for high speed acquisition of dimensional parameters of a workpiece as in claim 7, wherein said workpiece supports are centers.

10. Apparatus for high speed acquisition of dimensional parameters of a workpieces as in claim 7, wherein said workpiece supports are surface plates.

11. Apparatus for high speed acquisition of dimensional parameters of a workpiece as in claim 6, and further comprising:

a fixture for supporting said plurality of probes, said fixture having an interior shape closely conforming to the specific workpiece to be measured.

12. Apparatus for high speed acquisition of dimensional parameters of a workpiece as in claim 6, wherein each probe circuit further comprises a synchronous demodulator operatively connected in series with the oscillator, the filter, the amplifier, and the sampler.

13. Apparatus for high speed acquisition of dimensional parameters of a workpiece as in claim 6, wherein the sampling circuitry for each probe includes an independent probe circuit, each probe circuit comprising an oscillator, a synchronous demodulator, a filter, an amplifier, and an analog to digital converter operatively connected in series;

and wherein the sampling circuitry further comprises a timer operatively connected to said analog to digital converter to control simultaneous conversion of probe analog information signals to digital probe information signals;

and wherein each said analog to digital converter being operatively connected to pass said digital position information signals to said processor.

14. The apparatus of claim 6, wherein the probes are biased against the workpiece.

15. The apparatus of claim 14, wherein the probes are spring biased.

16. The apparatus of claim 14, wherein the probes are pneumatically biased.

17. The apparatus of claim 6, wherein the probes are arranged in sets of at least two probes per set.

18. The apparatus of claim 17, wherein at least one set of probes are linearly aligned with each other.

19. The apparatus of claim 17, wherein at least one set of probes are aligned in a common plane.

20. An apparatus for high speed acquisition of dimensional parameters of a workpiece, comprising:

a plurality of probes adapted to extend towards and contact the workpiece at predetermined locations on the workpiece;

a plurality of probe circuits, one probe circuit being operatively coupled to each probe;

an analog to digital converter operatively coupled the probe circuits, the analog to digital converter being adapted to be operatively coupled to a control unit; and a timer operatively coupled to the analog to digital converter and to each probe circuit for synchronizing simultaneous acquisition of the dimensional parameters.

21. The apparatus of claim 20, wherein each independent probe circuit comprises an oscillator, a synchronous demodulator, a filter, an amplifier and a sampler operatively coupled to one another.

22. An apparatus for high speed acquisition of dimensional parameters of a workpiece, comprising:

a plurality of probes adapted to extend towards and contact the workpiece at predetermined locations on the workpiece;

a plurality of probe circuits, one probe circuit being operatively coupled to each probe, wherein each independent probe circuit comprises an oscillator, a filter, an amplifier and an analog to digital converter operatively coupled to one another; and a timer operatively coupled to each probe circuit for synchronizing simultaneous acquisition of the dimensional parameters.

23. The apparatus of claim 22, wherein each independent probe circuit further comprises a synchronous demodulator operatively coupled to the oscillator, the filter, the amplifier, and the analog to digital converter.

24. The apparatus of claim 23, wherein the timer is coupled to each analog to digital converter.

* * * * *